United States Patent [19]
Wield

[11] Patent Number: 5,416,595
[45] Date of Patent: May 16, 1995

[54] METHODS AND APPARATUS FOR SECURING A DEGAUSSING COIL

[75] Inventor: Paul J. Wield, Poway, Calif.

[73] Assignee: Sony Electronics Inc., Park Ridge, N.J.

[21] Appl. No.: 57,051

[22] Filed: Apr. 29, 1993

[51] Int. Cl.⁶ .............................................. H04N 5/645
[52] U.S. Cl. .................................... 348/825; 348/820; 315/8; 361/150
[58] Field of Search ............................. 315/8; 361/150; 358/248, 242

[56] References Cited

U.S. PATENT DOCUMENTS

| | | | |
|---|---|---|---|
| 3,614,519 | 10/1971 | Figlewicz | 315/8 |
| 4,700,260 | 10/1987 | Craig et al. | 315/8 |
| 4,812,946 | 3/1989 | Prigent et al. | 315/8 |
| 5,038,078 | 8/1991 | Duggan | 315/8 |

FOREIGN PATENT DOCUMENTS 0106286  6/1985  Japan ........................................ 315/8

OTHER PUBLICATIONS

Service Manual CKV-20EXR/27EXR RM-771 US Model CKV-20EXR Chassis No. SCC-D5OH-A CKV-27EXR Chassis No. SCC-D5OJ-A Trinitron© Color TV Sony©, Mar. 24, 1992.
KV 13TR27 RM-781 US Model Chassis No. SCC-D3-7L-A Canadian Model Chassis No. SCC-D36H-A Trinitron© Color TV Sony©, Apr. 16, 1992.

Primary Examiner—Edward L. Coles, Sr.
Assistant Examiner—Fan Lee
Attorney, Agent, or Firm—Limbach & Limbach; Charles P. Sammut

[57] ABSTRACT

Methods and apparatus for securing a degaussing coil to a cathode ray tube (CRT) are disclosed wherein one or more restraint cables are used together with one or more cable ties to secure and position a degaussing coil onto a CRT. The method and apparatus of the present invention compensate for variations in the length of the degaussing coil without compromising the positioning of the degaussing coil on the CRT.

24 Claims, 5 Drawing Sheets

METHODS AND APPARATUS FOR SECURING A DEGAUSSING COIL

BACKGROUND OF THE INVENTION

1. Field of the Invention

The present invention relates to degaussing coils and in particular, to a method and apparatus for securing a degaussing coil onto a cathode ray tube (CRT).

2. Description of the Prior Art

CRTs in general rely upon either electromagnetic or electrostatic deflection to scan an electron beam across a phosphor screen. Upon impact by electrons, the phosphors within the screen emit visible light in one or more colors. Large screen CRTs used in direct view television sets rely upon electromagnetic deflection generated by a yoke that is affixed to the neck of the CRT near the junction of the neck and the funnel of the CRT envelope.

Because certain components within the CRT, such as an inner magnetic shield, an aperture grill and a frame for the aperture grille, may become magnetized because of (1) magnetic fields generated by the yoke, or (2) other components within a television set such as permanent magnet loudspeakers, or (3) external accessories mounted on top of or near the television, such as video cassette recorders and video games, it is extremely desireable to periodically degauss the CRT in order to minimize distortion of an image created by scanning an electron beam across the phosphor screen of the CRT. In addition, heat shrink bands, as detailed further herein, are fabricated from a magnetic steel and therefore may also become magnetized.

An early degaussing method consisted of the use of an external degaussing coil which, when energized by an alternating current (typically at a frequency of 60 Hz) was manually moved around the envelope of a CRT. Since magnetic distortion is more noticeable with color CRTs, automatic degaussers were developed as color televisions became more popular. One type of automatic degausser consists of a coil wrapped about the perimeter of the faceplate of a CRT, where the coil is driven during a short period by a 60 Hz current in series with a device known as a "posistor." The posistor not only limits the amount of current flowing through the degaussing coil, but also limits the period during which current will flow. The posistor is initially conductive when voltage is applied to the circuit, and then becomes non-conductive when the temperature of the posistor reaches a predetermined temperature. The posistor remains non-conductive until voltage is removed from the circuit. Thus, the degaussing coil is always energized for a brief period commencing with initial power-on of a television set. To avoid a distorted initial image, the degaussing coil is de-energized before an image appears on the phosphor screen of the CRT.

Some television sets utilize a large external magnetic shield surrounding the funnel of a CRT. In such sets the degaussing coil is attached to the external magnetic shield by plastic clips that snap into holes in the shield.

In order to both reduce expense and improve performance, many CRTs include an internal magnetic shield. With such arrangements, since an external magnetic shield is not available for attachment of a degaussing coil, one prior art method of securing a degaussing coil to a CRT relies upon adhesive backed plastic holders applied to the glass surface of a CRT to thereby provide an anchor for the degaussing coil. Such plastic holders however, provide inconsistent attachment strength due to variations in CRT surface preparation. In particular, the funnel of a CRT is usually coated with carbon for grounding purposes. In addition, because of the curvature of the envelope of a CRT, mismatches between the adhesive surface of such holders and the CRT decrease adhesive strength.

Another prior art method of securing a degaussing coil to a CRT uses adhesive tape applied over the top of the degaussing coil, with the adhesive tape attached to the CRT on both sides of the degaussing coil. However, with such a method the level of adhesion is dependent upon the method of application of the adhesive tape. In particular, if the tape contacts the degaussing coil only at a tangent to the degaussing coil, the adhesive strength will be less than when the tape is in contact with a greater surface area (per length) of the degaussing coil.

With both adhesive methods, not only is the strength of the bond initially inconsistent, but the strength of the bond tends to decrease with repeated thermal cycling.

Yet another prior art method of securing a degaussing coil to a CRT uses plastic hooks that are attached to a heat shrink band which is wrapped around the perimeter of the faceplate of a CRT (metallic heat shrink bands provide implosion protection and are designed to meet the standards set by Underwriters Laboratories). The length of these plastic hooks are selected to position the degaussing coil in the center area of the CRT. Such hooks however are cumbersome to use and are expensive.

During operation of a television, since an anode cap of a CRT has a potential in the tens of thousands of volts, if the degaussing coil is somehow positioned too close to the anode cap, arcing may result. If on the other hand the degaussing coil is positioned too close to the deflection yoke, it becomes very difficult to attach magnets which are necessary to adjust the CRT during assembly and alignment of a television.

Therefore, it would be desireable to provide a method and apparatus for securing a degaussing coil to a CRT which permits the secure and precise positioning of the degaussing coil without the need for adhesives.

SUMMARY OF THE INVENTION

The present invention is directed toward methods and apparatus for securing a degaussing coil to a CRT wherein one or more restraint cables are used together with one or more cable ties to secure and position a degaussing coil onto a CRT. The method and apparatus of the present invention compensate for variations in the length of the degaussing coil without compromising the positioning of the degaussing coil on the CRT.

The apparatus of one aspect of the present invention includes a degaussing coil formed into a first loop and a second loop, a plurality of spaced apart holders for positioning the degaussing coil adjacent to a cathode ray tube, securing means for securing the intersection of the first loop and the second loop, first restraining means for positioning the first loop, second restraining means for positioning the second loop and tensioning means for adjusting tension in the degaussing coil.

The method and apparatus of the present invention also facilitates rapid assembly and is more secure than previously known methods and apparatus.

The above features and advantages of the present invention will become apparent from the following description and the appended claims taken in conjunc-

DESCRIPTION OF THE PREFERRED EMBODIMENTS

Figure 1A:
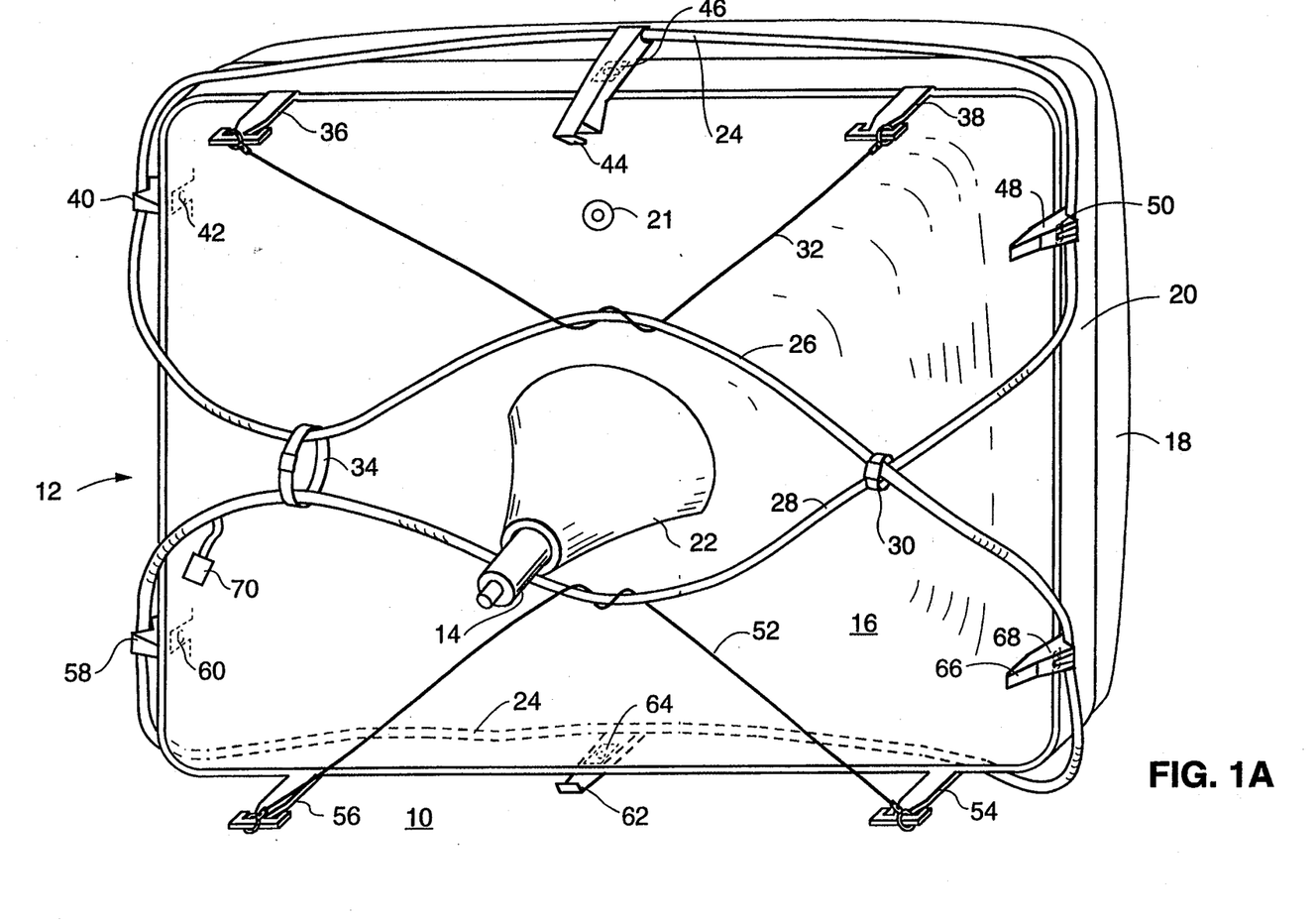
FIG. 1A is a perspective view illustrating a method and apparatus for securing a degaussing coil onto a CRT in accordance with the present invention.

Referring now to FIG. 1A, there is shown a degaussing coil attachment apparatus 10. A CRT 12 includes a neck 14, a funnel 16 and a faceplate 18. Mounted about the perimeter of the faceplate 18 is a heat shrink band 20. Positioned slightly below the surface of the funnel 16 is an anode cap 21.

A deflection yoke 22 is fixedly mounted on the neck 14 and extends to the funnel 16. A degaussing coil 24 is positioned about the CRT 12 near the intersection of the funnel 16 and the faceplate 18, and is described herein with reference to an upper loop 26 and a lower loop 28, which loops intersect at a first cable tie 30. The degaussing coil is shaped as a single continuous loop which is folded upon itself to form the upper loop 26 and the lower loop 28. In the preferred embodiment of the invention, the degaussing coil 24 consists of multiple turns of enameled 20 or 22 gauge wire enclosed within a non-conductive sheath. The precise length, number of turns and diameter of the enameled wire are selected to achieve a desired degaussing field. In the preferred embodiment of the invention, the first cable tie 30 is a conventional self-locking cable tie and is used to tightly secure or clamp the intersection of the upper loop 26 and the lower loop 28.

The upper loop 26 of the degaussing coil 24 is further routed through two loops of a first restraint cable 32 then through a second cable tie 34. This second cable tie 34 is a conventional self-locking cable tie. The restraint cable 32 is secured to a pair of tabs 36 and 38, which tabs form a part of the heat shrink band 20. The upper loop 26 is further routed along the perimeter of the faceplate 18 and is secured by one side of a plastic holder 40. The plastic holder 40 is attached to a tab 42 which is a part of the heat shrink band 20. The upper loop 26 is further routed along the top perimeter of the faceplate 18 and is secured by a double sided plastic holder 44. The plastic holder 44 is attached to a tab 46 which is a part of the heat shrink band 20. The upper loop 26 is also routed and positioned by a plastic holder 48 which is attached to a tab 50 of the heat shrink band 20.

After intersecting itself at the cable tie 30, the degaussing coil 24 follows a similar path on the lower half of the CRT 12. The lower loop 28 of the degaussing coil 24 is routed through two loops of a second restraint cable 52. In the preferred embodiment of the invention the first and second restraint cables 32 consist of insulated electrical wire. As detailed further herein, each end of each of the first and second restraint cables 32 and 52 are terminated with a separate ring connector that is crimped onto each end. The restraint cable 52 is secured to a pair of tabs 54 and 56 both of which tabs form a part of the heat shrink band 20. The lower loop 28 then passes through the second cable tie 34 and is then secured adjacent to the perimeter of the face plate 18 by a plastic holder 58. The plastic holder 58 is attached to a tab 60 which tab is a part of the heat shrink band 20. The lower loop 28 is further positioned along the perimeter of the face plate 18 at the bottom of the CRT, and is further secured by a plastic holder 62. The plastic holder 62 is attached to a tab 64, which tab is a part of the heat shrink band 20. The lower loop 28 is also routed back toward the cable tie 30 and is additionally secured by a plastic holder 66 that is attached to a tab 68. The tab 68 is a part of the heat shrink band 20.

Instead of being an integral part of the heat shrink band 20, the tabs 36, 38, 42, 46, 50, 54, 56, 60, 64 and 68 may be separate projections each of which are spot welded or otherwise bonded to the heat shrink band 20. In addition, such separate projections may include integral holders to thereby obviate the need for separate plastic holders. However, in the preferred embodiment of the invention, the use of the plastic holders 40, 44, 48, 58 and 60 facilitate assembly and provide further insulation between the degaussing coil 24 and chassis ground.

The degaussing coil 24 is coupled to an external a.c. current source (not shown) through a two-wire connector 70.

Referring again to FIG. 1A, in assembling the degaussing coil securing apparatus 10, the plastic holders 40, 44, 48, 58, 62 and 66 are snapped onto the tabs 42, 46, 50, 60, 64 and 68, respectively, of a heat shrink band 20 which has been preassembled onto the CRT 12. Before positioning of the degaussing coil 24 on the CRT 12, the first cable tie 30 is secured around a predetermined intersection of the degaussing coil 24. The degaussing coil 24 is then positioned onto the CRT 12 and into the plastic holders 40, 44, 48, 58, 62 and 66. The first restraining cable 32 is wrapped around the degaussing coil 24 above the neck 14, and the ends of the first restraining cable 32 are secured to the tabs 36 and 38. Similarly, the second restraining cable 52 is wrapped twice around the degaussing coil 24, and the ends of the second restraining cable 52 are secured to the tabs 36 and 38.

Then the second cable tie 34 is secured around the adjacent portions of the degaussing coil 34 as shown in FIG. 1A to thereby set the desired level of tension applied to the degaussing coil 24. An appropriate calibrated tensioning tool may be utilized to cinch the cable tie 34 to a predetermined level of tension. In addition to setting the level of tension, the second cable tie 34 compensates for variances in the length of the degaussing coil 24 since the second cable tie is of adjustable length. In a first alternative embodiment, the second cable tie 34 may be replaced by an extension spring. Such a spring would also provide the required tension to position and secure the degaussing coil 24.

In a second alternative embodiment, the second cable tie 34 may be replaced by a set of linear hooks which engage one of a plurality of rows of loops. The row which corresponds most closely to the required tension would be selected. In a third alternative embodiment, a strap which includes high density hook and loop fasteners, such as a VELCRO brand fastener, could be used to provide a more precise level of tension adjustment than is provided by the second alternative embodiment. Other embodiments which can be used in place of the second cable tie 34 are described further herein with respect to FIGS. 9, 9A, 9B, 9C, 10, 10A, 10B, and 10C.

Figure 1B:
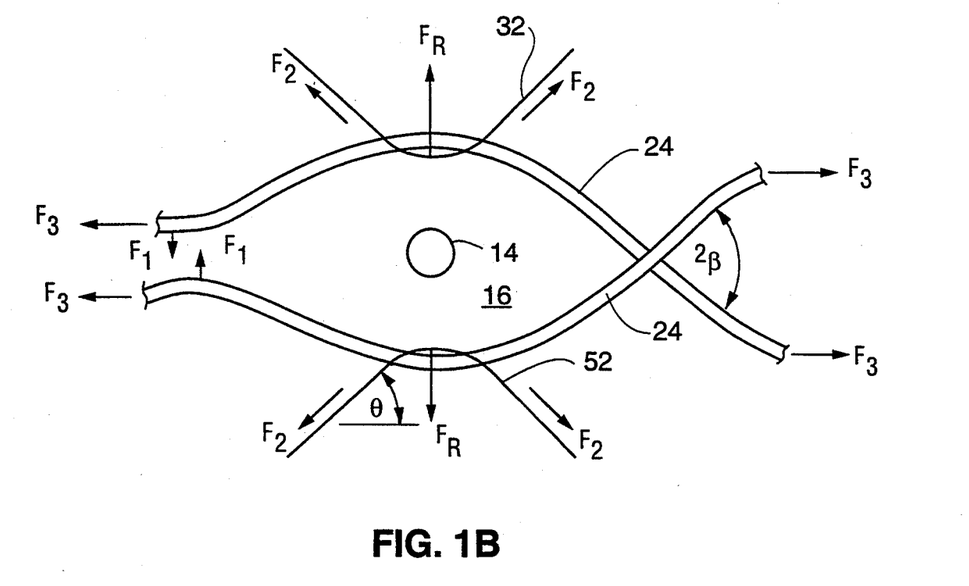
FIG. 1B is a diagram which illustrates the distribution of forces applied to the degaussing coil of FIG. 1A.

Referring now to FIGS. 1A and 1B, the various forces applied to the degaussing coil 24 are explained in further detail. Since the first cable tie 30 prevents the intersection of the degaussing coil 24 from sliding upon itself, the force $F_R$ is equal to the sum of the force $F_2$ applied by each of the restraining first and second restraining cables 32 and 52 times $\sin(\theta)$, where $\theta$ is the angle between (1) the centerline between the tabs 36 and 38 and either linear section of the first restraining cable 32. Assuming that $\theta$ is approximately 30°, $\sin(\theta) = \frac{1}{2}$. Therefore, the force $F_R$ is equal to $2F_2 \times \frac{1}{2} = F_2$.

The second cable tie 34 exerts a force $F_1$ to hold the degaussing coil 24 together. Since $F_1$ is approximately equal to $F_2/2$, $F_1$ is approximately equal to $F_R$.

The force $F_3$ exerted upon opposite sides of the degaussing coil, just to the left of the second cable tie 34 and to the right of the first cable tie 30 is equal to $\frac{1}{2} F_R/\tan(\beta)$, where $\beta$ is approximately equal to one half the angle formed between the degaussing coil 24 to either the left of the second cable tie 34 or to the right of the first cable tie 30. Thus, assuming that $\beta = 45°$, $\tan(45°) = 1$, therefore $F_3 \frac{1}{2} F_R$.

In the preferred embodiment of the invention, $F_R$ is set at approximately 10 pounds of force, thereby resulting in both $F_2$ and $F_3$ equal to about 5 pounds of force. Because of the geometry of the apparatus 10, these resultant forces also provide a component of force which holds the degaussing coil 24 tightly against the funnel 16 of the CRT 12.

Figure 3:
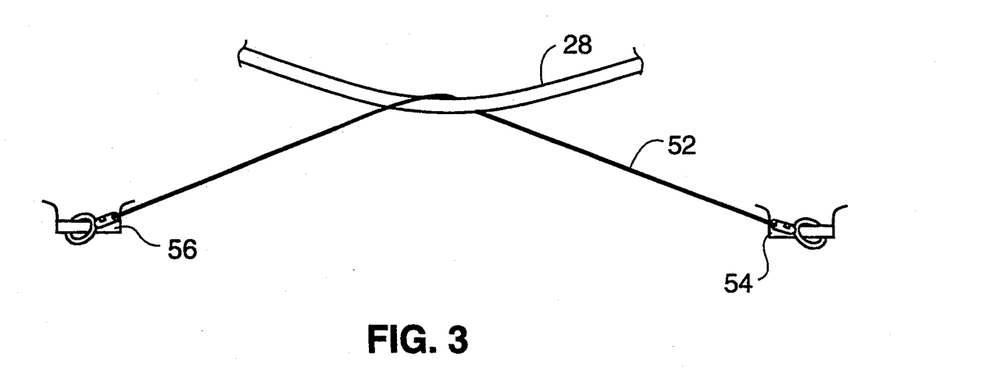
FIG. 3 is a partial elevation view illustrating an alternative embodiment of the restraining cable shown in FIGS. 1 and 2.

Referring now to FIG. 3, there is shown an alternative embodiment of the junction between the second restraint cable 52 and the bottom loop 28 of the degaussing coil 24. In particular, the second restraint cable 52 may be wrapped around the bottom loop 28 only once instead of twice as shown in FIG. 1A. Similarly, although not shown, the first restraint cable 32 may be wrapped once around the upper loop 26 of the degaussing coil 24 instead of being wrapped twice as shown in FIG. 1A. The use of the single loop permits the use of a slightly decreased length of each of the first restraint cable 32 and the second restraint cable 52.

Figure 2:
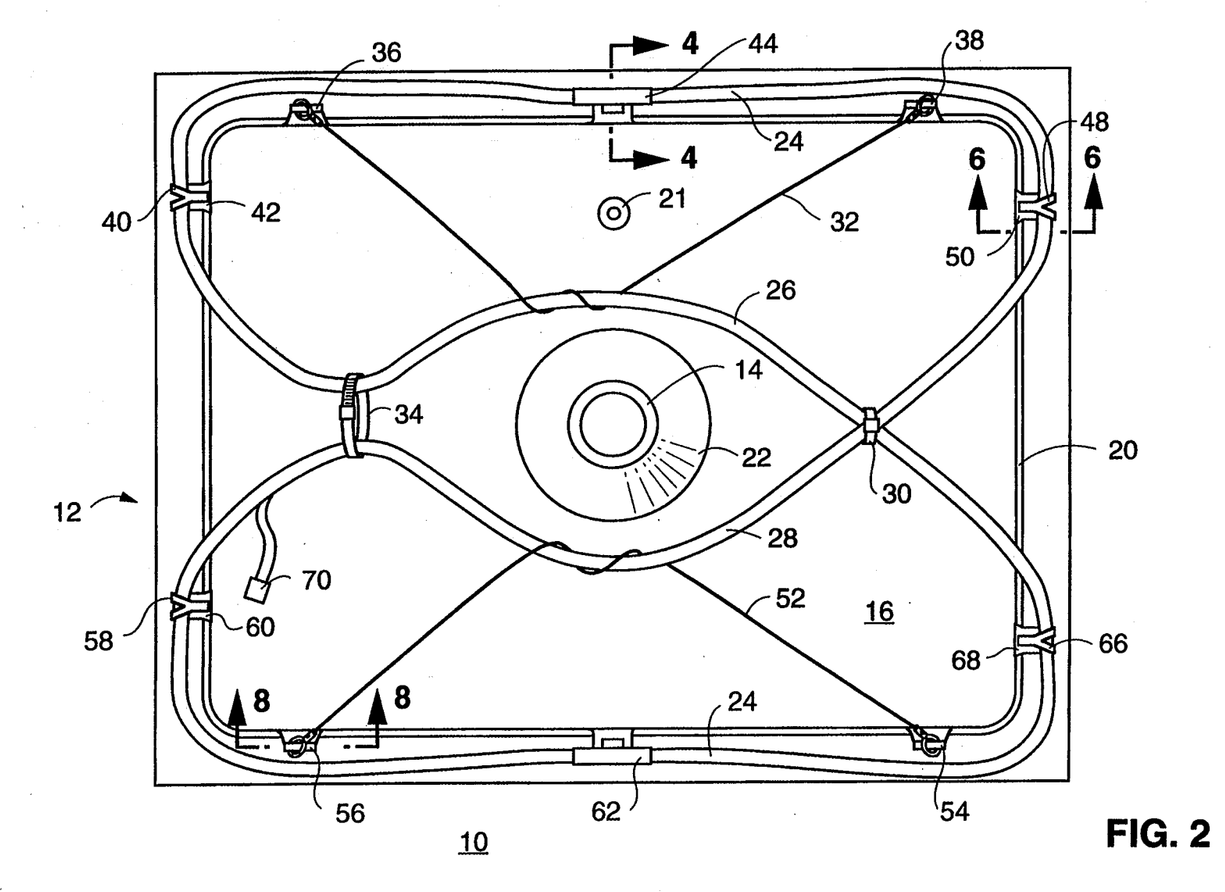
FIG. 2 is an elevational view of the degaussing coil and CRT of FIG. 1.
Figure 4:
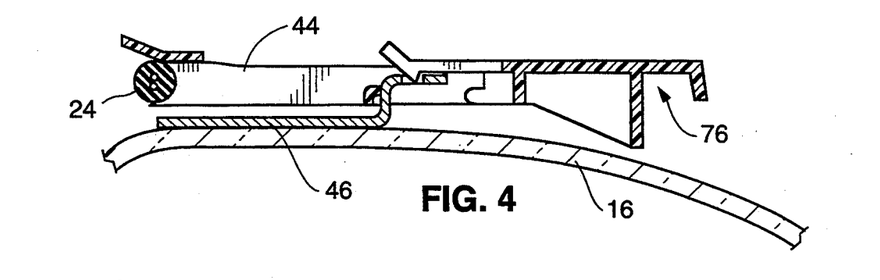
FIG. 4 is a sectional view taken along line 4—4 of FIG. 2 illustrating a degaussing coil attachment method and apparatus in accordance with the present invention.
Figure 5:
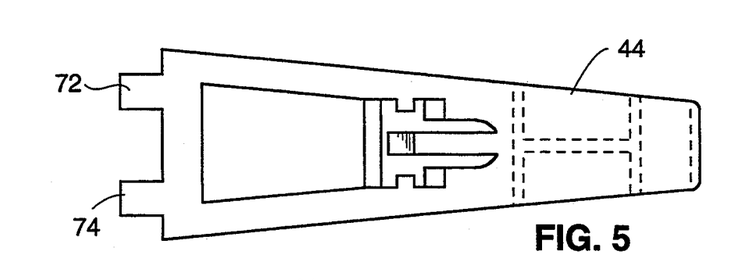
FIG. 5 is a plan view of a the plastic holder shown in FIG. 4.

Referring now to FIGS. 2, 4 and 5, FIG. 2 calls out details of the junction between the various plastic holders and their respective tabs on the heat shrink band 20. With reference now to line 4—4 of FIG. 2 and to FIG. 4, the plastic holder 44 is shaped to receivably engage the tab 46, which is mounted to the heat shrink band 20, to thereby position the degaussing coil 24 toward the front of the faceplate 18 as shown in FIG. 1A. In further detail, the plastic holder 44 includes a pair of projections 72 and 74 which operate to position and secure the degaussing coil 24. The plastic holder 44 also includes a channel 76 which may be utilized, as previously described herein, to position a grounding cable. In the preferred embodiment of the invention, the plastic holders 44 and 62 are identical.

Figure 6:
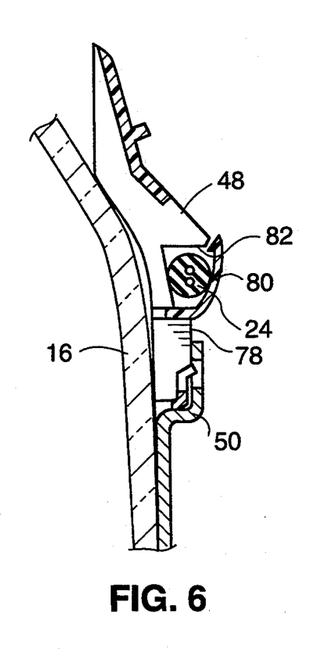
FIG. 6 is a sectional view taken along line 6—6 of FIG. 2 illustrating a degaussing coil attachment method and apparatus in accordance with the present invention.
Figures 7, 8:
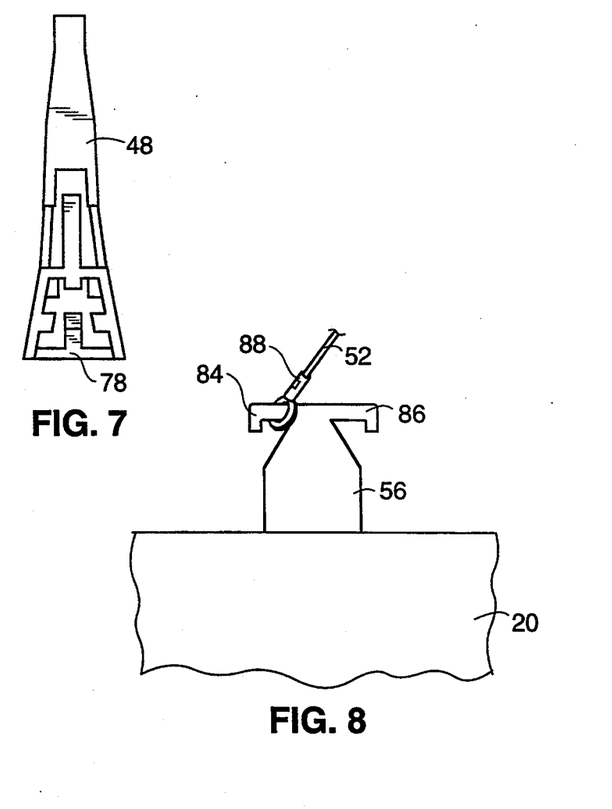
FIG. 7 is an elevation view illustrating the plastic holder shown in FIG. 6.
FIG. 8 is a view taken along line 8—8 of FIG. 2 illustrating a method and apparatus for securing the restraining cable to a projection of a heat shrink band.
Figure 9:
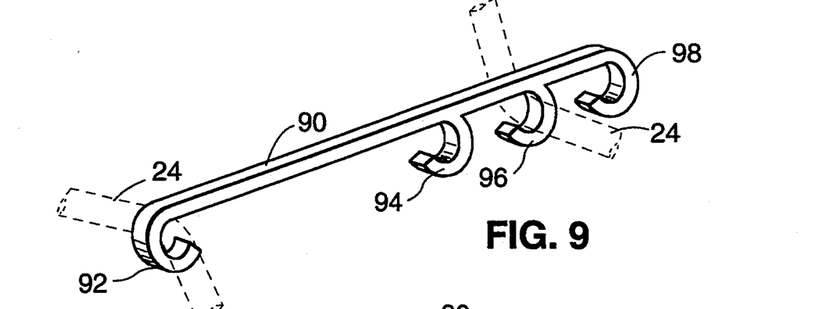
FIG. 9 is a perspective view illustrating a retainer in accordance with the present invention.
Figure 9A:
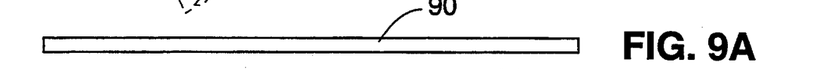
FIG. 9A is a top plan view of the retainer of FIG. 9.
Figure 9B:
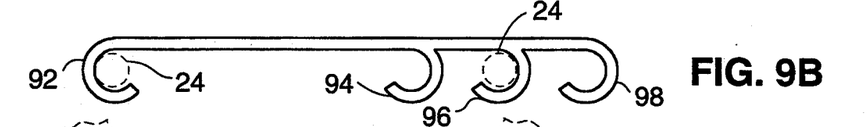
FIG. 9B is a front plan view of the retainer of FIG. 9.
Figure 9C:
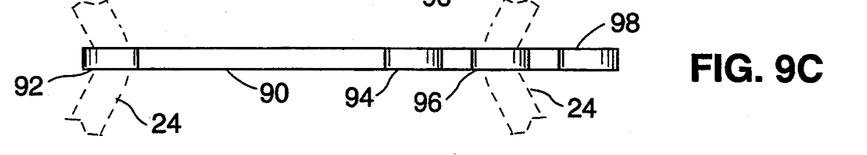
FIG. 9C is a bottom plan view of the retainer of FIG. 9.
Figure 10:
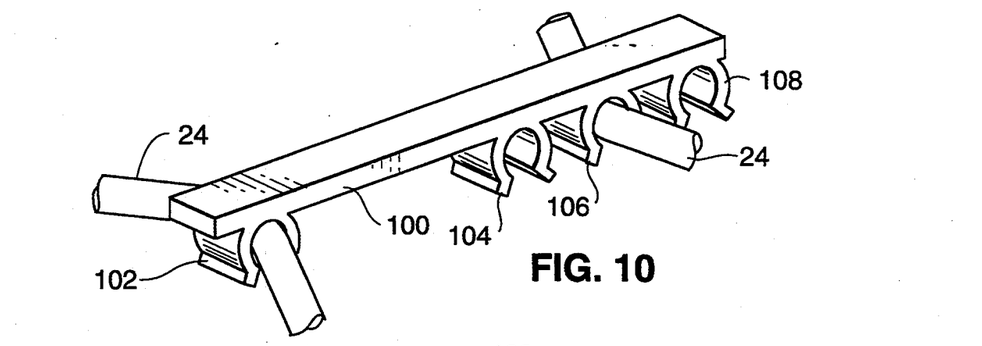
FIG. 10 is a perspective view of a wire loom in accordance with the present invention.
Figure 10A:
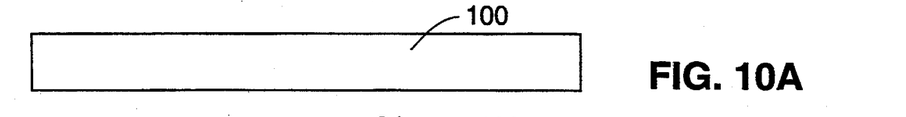
FIG. 10A is a top plan view of the wire loom of FIG. 10.
Figure 10B:
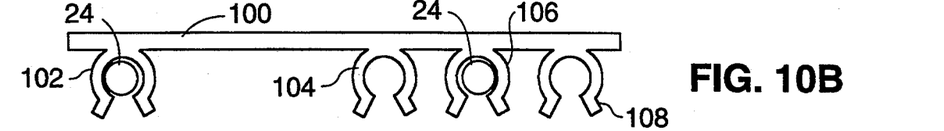
FIG. 10B is a front plan view of the wire loom of FIG. 10.
Figure 10C:
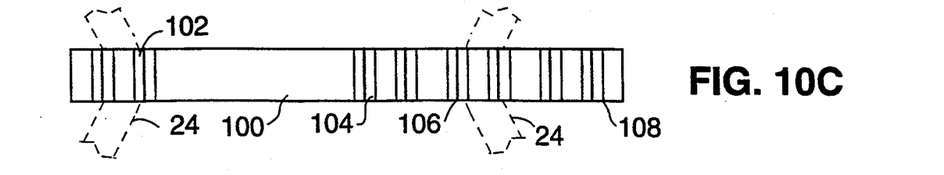
FIG. 10C is a bottom plan view of the wire loom of FIG. 10.

With reference now to line 6—6 of FIG. 2, and to FIGS. 6 and 7, the plastic holder 48 is described in further detail. Plastic holder 48 includes a projection 78 which snaps between the tab 50, which is mounted to the heat shrink band 20, and the funnel 16. A movable wall 80 secures the degaussing coil 24 within an essentially closed channel 82. In the preferred embodiment of the invention, the plastic holders 40, 58 and 66 are identical in construction to that of the plastic holder 48.

With reference now to FIGS. 1A, 2 and 8, the method and apparatus for attachment of the second restraining cable 52 is described. Although reference is made to the second restraining cable 52, the following also applies to the first restraining cable 32.

The tab 56 includes a first hook 84 and a second hook 86. Secured onto the first hook 84 is a ring type connector 88 which has been crimped onto one end of the second restraint cable 52 using standard industry equipment. As clearly illustrated in FIG. 1B, the force on the second restraint cable 52 prevents the ring type connector 58 from disengaging from the first hook 84. In the preferred embodiment of the invention, this hook and ring type connector arrangement is utilized at both ends of each of the first restraint cable 32 and the second restraint cable 52.

Alternatively, the ends of each of the first restraining cable 32 and the second restraining cable 52 may be tied onto their respective hooks by tying a knot, with a lanyard, or using a restraining cable in the form of a continuous loop, such as a rubber band.

As an alternative to attaching the plastic holders 40, 44, 48, 58, 62, and 66 to the heat shrink band 20, tabs may be instead attached to the front portion of an enclosure which surrounds the CRT. In further detail, most television sets are housed within a two-piece plastic enclosure where a front section surrounds the edges of the CRT 12 and may also provide a front panel. The rear section generally surrounds the neck 14 of the CRT 12. The tabs may therefore be secured to the front portions of the enclosure to thereby surround the CRT 12.

With reference now to FIGS. 9, 9A, 9B and 9C there is shown a fourth alternative embodiment of the second cable tie 34. In particular, a retainer 90 includes a first hook 92 at one end of the retainer 90 with a plurality of adjacent opposing hooks 94, 96 and 98 spaced apart from the first hook 92. As shown, the appropriate portion of the either the top loop 26 or the bottom loop 28 of the degaussing coil 24 is first positioned within the first hook 92. Then the appropriate portion of the remaining loop is positioned within one of the opposing hooks 94, 96 or 98 in order to selected the desired level of tension. In contrast to the second cable tie 34, the use of the retainer 90 permits adjustments from a higher level of tension to a lower level of tension.

Referring now to FIGS. 10, 10A, 10B and 10C there is shown a fifth alternative embodiment to the second cable tie 34. In particular, a retainer in the form of a wire loom 100 includes a first expandable channel 102 at one end of the wire loom 100 spaced apart from a plurality of adjacent expandable channels 104, 106 and 108. As shown, the appropriate portion of the either the top loop 26 or the bottom loop 28 of the degaussing coil 24 is first positioned within the first expandable channel 102. Then the appropriate portion of the remaining loop is positioned within one of the expandable channels 104, 106 or 108 in order to selected the desired level of tension. In contrast to the second cable tie 34, the use of the wire loom 100 permits adjustments from a higher level of tension to a lower level of tension.

It should be understood that various alternatives to the embodiments of the invention described herein may be employed in practicing the invention. It is intended that the following claims define the scope of the invention and that the methods and apparatus within the scope of these claims and their equivalents be covered thereby.

I claim:

1. An apparatus for securing a degaussing coil to a cathode ray tube comprising:
   a degaussing coil formed into a first loop and a second loop;
   a plurality of spaced apart holders for positioning the degaussing coil adjacent to the cathode ray tube;
   securing means for securing the intersection of the first loop and the second loop;
   tensioning means for adjusting tension in the degaussing coil;
   first restraining means for positioning the first loop, a portion of the first restraining means wrapped around a portion of the first loop between the securing means and the tensioning means; and
   second restraining means for positioning the second loop, a portion of the second restraining means wrapped around a portion of the second loop between the securing means and the tensioning means.

2. The apparatus of claim 1, wherein the cathode ray tube includes a band surrounding and attached to the perimeter of a faceplate thereof, wherein said plurality of spaced apart holders are mounted to said band.

3. The apparatus of claim 1, the cathode ray tube including a band surrounding and attached to the perimeter of a faceplate of the cathode ray tube, wherein said first restraining means further comprises:
   flexible means slideably coupled to the first loop and coupled to at least two locations of said band.

4. The apparatus of claim 3 wherein said second restraining means further comprises:
   flexible means slideably coupled to the second loop and coupled to at least two locations of said band.

5. The apparatus of claim 1 where said first loop is positioned between a yoke mounted on said cathode ray tube and an anode cap of said cathode ray tube.

6. The apparatus of claim 1 wherein said securing means comprises:
   a cable tie.

7. The apparatus of claim 1 wherein said tension means comprises:
   a cable tie.

8. The apparatus of claim 1 wherein said tension means comprises:
   an expansion spring.

9. The apparatus of claim 1 wherein said tension means comprises:
   at least one hook; and
   a plurality of loops.

10. The apparatus of claim 1 wherein said tension means comprises:
    a retainer, wherein said retainer includes a first hook and a plurality of opposing hooks.

11. The apparatus of claim 1 wherein said tension means comprises:
    a retainer, wherein said retainer includes a first expandable channel spaced apart from a plurality of adjacent expandable channels.

12. An apparatus for positioning a degaussing coil on a cathode ray tube, wherein the cathode ray tube includes a funnel and a neck, the apparatus comprising:
    a degaussing coil;
    a plurality of spaced apart fixedly mounted holders for positioning at least a portion of the degaussing coil about the periphery of the funnel of the cathode ray tube;
    clamping means substantially bisecting the degaussing coil;
    tension means surrounding a portion of the degaussing coil for adjusting tension in the degaussing coil; and
    restraint means for applying forces to first and second opposite portions of the degaussing coil, the first and second opposite portions adjacent to the neck of the cathode ray tube and between the clamping means and the tension means, said forces in directions away from the neck of the cathode ray tube and toward the funnel of the cathode ray tube.

13. The apparatus of claim 12 further comprising:
    a band surrounding and attached to the perimeter of the funnel.

14. The apparatus of claim 13 wherein said holders are attached to said band.

15. The apparatus of claim 12 wherein said clamping means comprises:
    a cable tie.

16. The apparatus of claim 12 wherein said tension means comprises:
    a cable tie.

17. The apparatus of claim 12 wherein said tension means comprises:
    an expansion spring.

18. The apparatus of claim 12 wherein said tension means comprises:
    at least one hook; and
    a plurality of loops.

19. The apparatus of claim 12 wherein said tension means comprises:
    a retainer, wherein said retainer includes a first hook and a plurality of opposing hooks.

20. The apparatus of claim 12 wherein said tension means comprises:
    a retainer, wherein said retainer includes a first expandable channel spaced apart from a plurality adjacent expandable channels.

21. The apparatus of claim 12 wherein said tension means pulls at least a portion of a first bisection of the degaussing coil toward at least a portion of a second bisection of the degaussing coil.

22. An apparatus for securing a degaussing coil on a cathode ray tube, wherein the cathode ray tube includes a band surrounding and attached to the perimeter of a faceplate thereof, the apparatus comprising:
- a degaussing coil forming a first loop and a second loop;
- a plurality of spaced apart holders attached to the band for positioning the degaussing coil adjacent to the cathode ray tube, said holders mounted on said band;
- a first cable tie for securing the junction of the first loop and the second loop;
- a second cable tie for adjusting tension in the degaussing coil;
- a first flexible wire for positioning and applying a force to the first loop, a portion of the first flexible wire wrapped around a portion of the first loop between the first cable tie and the second cable tie, said force applied to the first loop away from a neck of the cathode ray tube and toward a funnel of the cathode ray tube; and
- a second flexible wire for positioning and applying a force the second loop, a portion of the second flexible wire wrapped around a portion of the second loop between the first cable tie and the second cable tie, said force applied to the second loop away from the neck of the cathode ray tube and toward the funnel of the cathode ray tube.

23. A method of securing a degaussing coil to a cathode ray tube, wherein the cathode ray tube includes a neck and funnel, the method comprising the steps of:
- providing a degaussing coil formed into a first loop and a second loop;
- securing at least a portion of each of the first loop and the second loop about a periphery of the funnel;
- securing the intersection of the first loop and the second loop;
- applying forces upon adjacent portions of the first and second loops, the adjacent portions opposite to said intersection, the forces opposite in direction;
- applying a force to a portion of the first loop both adjacent to the neck and between said intersection and said adjacent portions of the first and second loops opposite to said intersection, the force directed away from the neck; and
- applying a force to a portion of the second loop both adjacent to the neck and between said intersection and said adjacent portions of the first and second loops opposite to said intersection, the direction of the force both opposite to the force applied to the first loop and directed away from the neck.

24. A method of positioning a degaussing coil on a cathode ray tube, wherein the cathode ray tube includes a funnel and a neck, the method comprising the steps of:
- clamping a degaussing coil to form a first loop and a second loop;
- positioning at least a portion of the degaussing coil about the periphery of the funnel;
- pulling at least a portion of the first loop toward at least a portion of the second loop to adjust said forces applied to the degaussing coil; and
- applying forces to first and second opposite portions of the degaussing coil, the first and second opposite portions adjacent to opposite sides of the neck of the cathode ray tube and between the clamped portion of the degaussing coil and the pulled portions of the first and second loops, said forces in a direction away from the neck and toward the funnel of the cathode ray tube.

* * * * *